Feb. 7, 1967 A. H. BRACKETT, JR., ET AL 3,303,450
SYMMETRICAL DUAL-GRID STRAIN GAGING
Filed Oct. 6, 1964 2 Sheets-Sheet 1
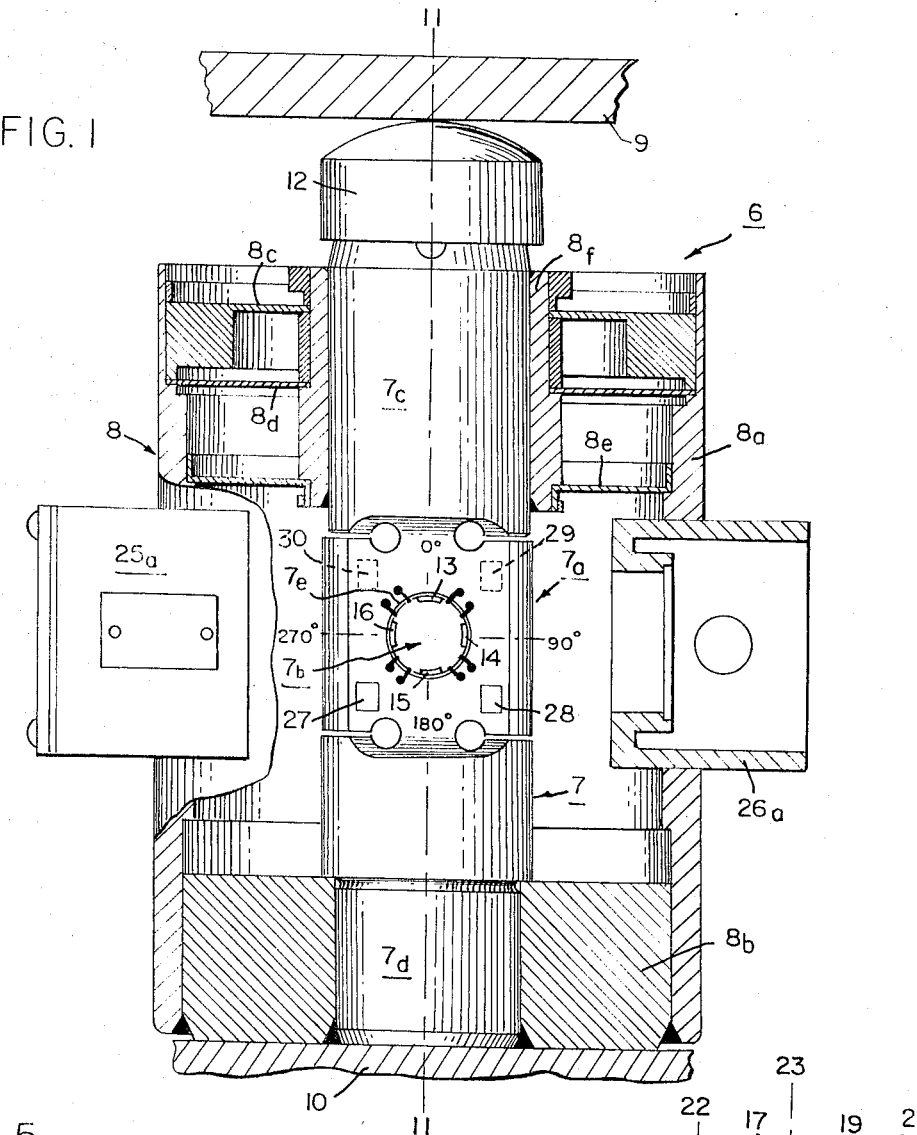
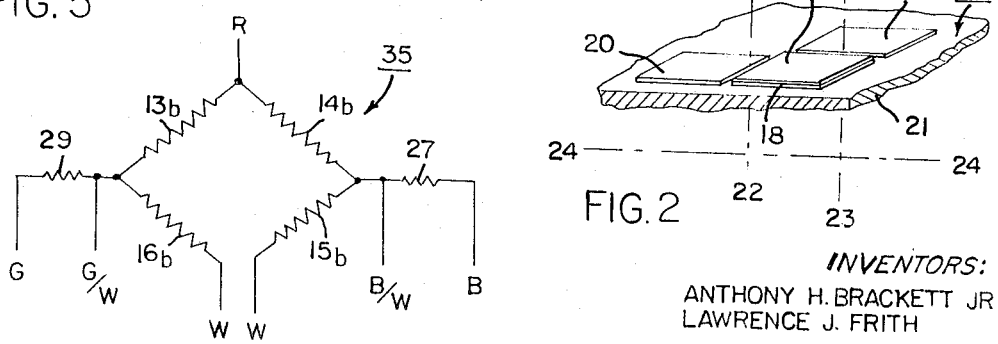
INVENTORS:
ANTHONY H. BRACKETT JR
LAWRENCE J. FRITH
BY,
Dike, Thompson, Bronstein & Mros
ATTORNEYS

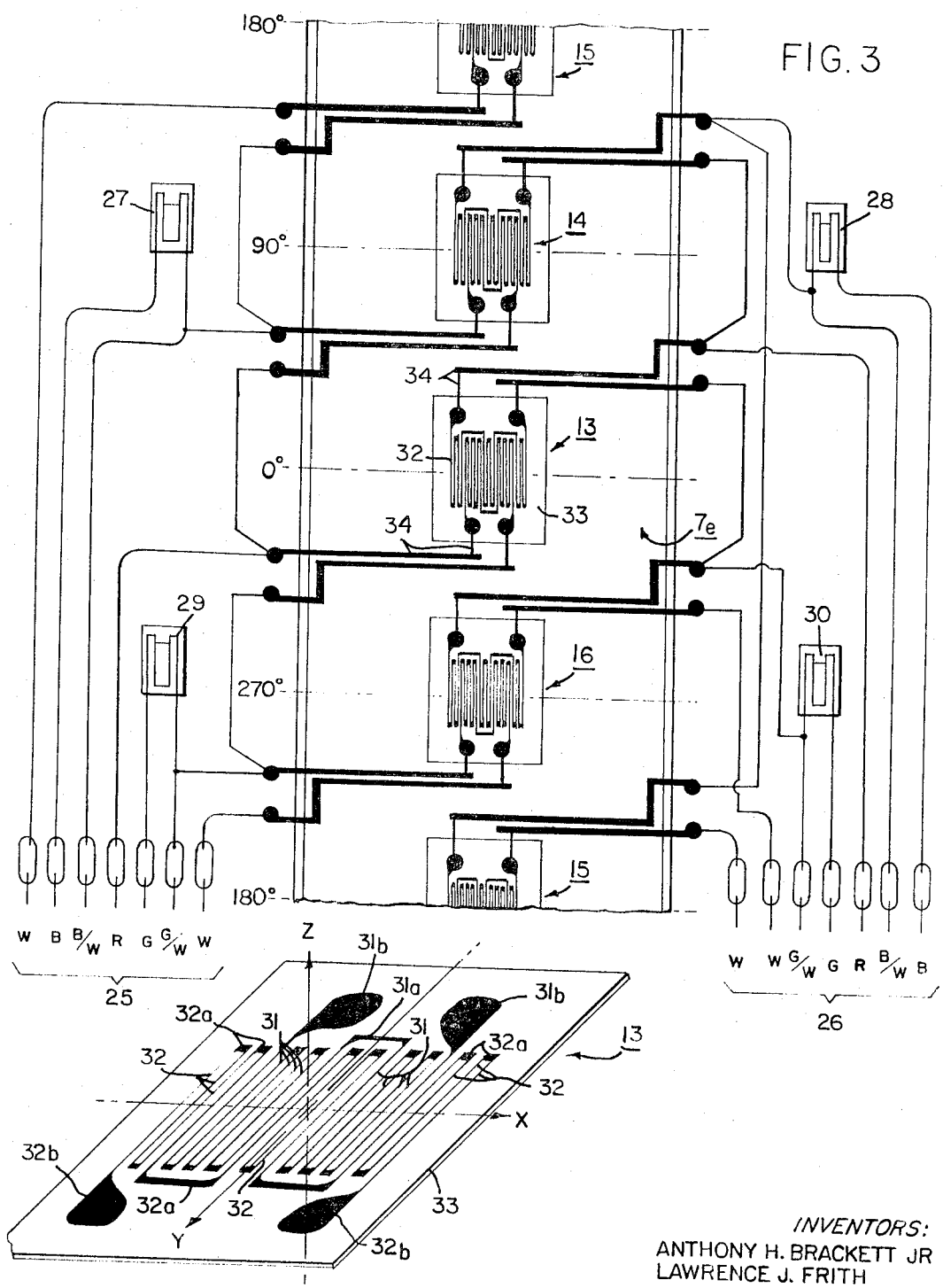

United States Patent Office 3,303,450
Patented Feb. 7, 1967

3,303,450
SYMMETRICAL DUAL-GRID STRAIN GAGING
Anthony H. Brackett, Jr., Belmont, and Lawrence J. Frith, Cambridge, Mass., assignors to BLH Electronics, Inc., Waltham, Mass., a corporation of Delaware
Filed Oct. 6, 1964, Ser. No. 401,936
4 Claims. (Cl. 338—2)

The present invention relates to improvements in strain-responsive electrical measurement apparatus and, in one particular aspect, to novel and improved arrangements of electrical strain gage grids having electrically-isolated filaments uniquely interleaved in substantially the same curved or flat plane to enable electrical interconnections thereof which suppress position-induced errors.

In classic constructions, electrical strain gage transducer elements are formed of elongated filaments wound or otherwise laid in a compact grid-like pattern in which relatively short lengths are closely spaced parallel to one another and are adhesively bonded to a supporting insulating membrane or the like which promotes ease of handling and installation upon a surface exhibiting the strains to be measured. Commonly the filaments comprise electrical resistance wire, although they may also be in such forms as a foil or lengths of semiconductor material. As is well known, such transducer elements are applied, by cementing, for example, to certain surfaces of beams, columns, rings, diaphragms and other sensing elements, and the surface strains resulting from loading are exhibited in terms of varied electrical impedances of the transducer elements, thereby characterizing the loading conditions experienced by such elements. Pressure, tension, compression, shear, weight, displacement, and so forth, may be either directly indicated by or deduced from readings of electrical instruments, preferably by way of electrical instrumentation of the outputs of Wheatstone bridge circuitry which incorporates the transducers.

It is often found that the sites where gages must be located on sensing elemens for optimum response to the specific condition sought to be measured will also undesirably exhibit disturbing effects resulting from other conditions. In the case of a load cell, for example, the extraneous strains introduced by bending or eccentric loading may cause the strain gages to respond to these as well as to the forces of interest appearing along a given sensing axis of the cell. Reduction of errors originating in this way has been approached by electrically and physically pairing gages in a manner tending to promote cancellations of the unwanted signals. Structurally, this has lead to stacking of transducers, by superpositioning one strain gage grid over another, and to use of side-by-side or end-to-end arrays of strain gage grids in the same plane. Both of these techniques prove to be deficient; on the one hand, errors result out of the unavoidable differences in distances of stacked grids from the neutral axis of the sensing element and from the surfaces of the sensing element to which they are bonded in layers, and, on the other hand, errors are also the result of physical displacements between adjacent gages because the different gages may not sense precisely the same surface strains and further because the polarities of strains sensed by different pairs of such gages may change under different loading conditions, thereby preventing the desired cancellations in the associated electrical circuitry. In accordance with the present teachings, however, difficulties of the aforesaid character are circumvented and installation of gages is both simplified and rendered highly precise, by strain gage units each integrating a pair of like strain gage elements in a coplanar interleaved and symmetrical array.

One of the objects of the present invention, therefore, is to provide novel and improved electrical strain gaging which facilitates electrical suppression of erroneous signals induced by unavoidable extraneous strains and which simplifies and increases precision of strain-responsive measurements.

Another object is to provide unique dual-grid electrical strain gages of symmetrical configuration and construction which promote highly accurate and economical measurements of predetermined strains independently of spurious strains which may be present at the same time.

It is a further object to provide a symmetrical interleaved array of electrically-isolated elongated strain gage members which are coplanar and which are electrical equivalents in their responses to strains appearing at given surface sites.

Still further it is an object to provide unique paired precision strain gage units lending themselves to low-cost manufacture and installation and exhibiting two like but independent electrical gaging characteristics responsive to strains appearing about three intersecting mutually-perpendicular coordinate axes of the units.

By way of a summary account of practice of this invention in one of its aspects, a load-cell structure of the type having a sensing element in the form of a load-transmitting column with a transverse cylindrical opening therethrough is provided with four pairs of special electrical-resistance type strain gage grids each disposed with its grid wires extending in the circumferential direction about the inner periphery of the opening and each bonded to the inner periphery at a different quadrantal location angularly about the opening. Each strain gage grid in each pair comprises a plurality of coplanar parallel elongated electrical conductors having a predetermined resistivity per unit of length, the adjoining conductors being joined at their ends by short transverse low-resistance end connections to form a two-terminal compact electrical resistance element wherein the conductors are in series. The patterns of conductor spacings and end connections for the respective grids in each pair are complementary in that the two coplanar grids interleave without electrically contacting one another at any position; moreover, the parallel conductors forming the two grids have the same total lengths, in their direction of elongation, disposed symmetrically on both sides of two mutually perpendicular coordinate axes with which they are coplanar. The eight grids thus formed are wired to form two four-arm electrical bridges, in both of which undesirable bending effects exhibited by the sensing element cause mutually-cancelling electrical bridge unbalance effects.

Although the aspects of this invention which are believed to be novel are set forth in the appended claims, additional details as to preferred practices of the invention and as to the further objects, advantages, and features thereof may be most readily comprehended through reference to the following description taken in connection with the accompanying drawings, wherein:

FIGURE 1 depicts a load cell installation of a dual-bridge type involving a load column in association with improved dual-grid strain gage units, the cell casing being broken away to reveal internal constructional details;

FIGURE 2 illustrates a mounted strain gage unit in its relationships with certain coordinate and neutral bending axes;

FIGURE 3 is an enlarged pictorial development of the gaging surface of the load column shown in FIGURE 1, together with applied dual-grid gages and associated electrical connections;

FIGURE 4 illustrates a dual-grid strain gage of the type employed in the apparatus of FIGURES 1 and 3; and FIGURE 5 is a schematic diagram characterizing the electrical bridge connections for each of two strain-gage bridge circuits employed in the apparatus of FIGURES 1 and 3.

The high-capacity load cell equipment 6 appearing in FIGURE 1 is of a known basic type including a load-sensing element 7 having the general form of a cylindrical column, 7, the intermediate portion 7a of which exhibits a relatively large circular transverse opening 7b, and the opposite ends 7c and 7d of which establish connections with a housing structure 8 and serve as load-transmitting connections. In the illustrated arrangement, the cell is intended to be responsive to compressive forces appearing between external members 9 and 10 along its central longitudinal axis 11—11, although the usual internal threadings (not shown) in load-transmitting end portions 7c and 7d likewise permit measurements responsive to forces in tension along the same axis. Cylindrical hermetic-sealing and guide housing 8a is securely fastened with sensing-element portion 7d by way of a rigid base 8b, and a set of axially-spaced sealing diaphragms 8c–8e flex to accommodate relative axial displacements of sensing-element portion 7c via sleeve 8f while inhibiting its lateral movements.

Rounded load button 12 threaded into load-transmitting portion 7c is designed to reduce couplings of eccentric, side, and angular loadings to sensing element 7 from the bearing plate 9; however, it nevertheless commonly occurs that the applied loading includes one or more components of load which are oriented at an angle to, and/or eccentric in relation to, or normal to the longitudinal axis 11—11. Accordingly, the strain gage units 13–16 associated with intermediate portion 7a of the sensing element tend to respond to these components of loading, as well as to that which is of interest, and measurement errors result. In those instances where strain gages can be maintained in perfectly symmetrical orientations relative to axes about which the loadings and strains occur, it is theoretically possible to perform very accurate measurements by combining gage outputs in bridge circuitry wherein the effects of undesired strains tend to be self-cancelling. Often it is necessary that more than one set of gages be used, in more than one bridge circuit, for such dual purposes as simultaneous local and remote indications, or simultaneous recording and indication of measurements. In the latter connection, the desired redundancies have in the past been approached through the aforementioned techniques of stacking, or pairing like gages in side-by-side or end-to-end relationship at nearly the same position. However, the physical displacements of gages involved in these paired arrangements can be sufficient to lead to measurement errors, not only as between the indications afforded by the respective bridge arrays, but also within each of the bridge circuits. By way of illustration concerning the sources of errors, the like strain gages 17–20 of known construction are shown affixed to a strain-exhibiting surface 21a of a load-carrying member 21 in FIGURE 2, and it is evident that no two of these gages can be oriented to respond in precisely the same manner to all effects of loading. End-to-end gages 18 and 20 are necessarily displaced in relation to an axis 22—22, for example, and, under certain circumstances, each gage may respond to extraneous strains of different senses and, in electrical bridge circuit combinations with other gages, may fail to exhibit the polarity of resistance changes needed to produce compensations for the occurrence of such unwanted strains. This may be readily understood by considering that such end-to-end pairs of gages are located at the positions of gages 13 and 15 in FIGURE 1, whereupon C-shaped bending of the load column will cause the two gages on each side of the central axis to exhibit the same polarity of resistance change (due to tension or compression), whereas an S-shaped bending of the load column will cause these same two gages to witness different strains (one in tension, the other in compression). Thus, such gages cannot be relied upon to have their resistance changes due to extraneous strains (i.e., other than along a predetermined axis) develop cancellations in a given bridge circuit wiring. Similar disadvantages arise with the side-by-side relationship of gages 18 and 19, on opposite sides of an axis 23—23. Superpositioning or "stacking," as in the case of gages 17 and 18, necessarily involves physical location of their strain-responsive foils, wires, or the like (not visible in the illustrations) in different planes. The differences in location are carried over into differences of the respective gage conductors from a neutral axis, such as axis 24—24, and the gages thus sense different amounts of undesirable strains due to bending or other extraneous effects on the transducer element which supports them. It is also known that gage grids further from the strain-exhibiting surface are less stable under strain than those which are bonded as close as possible to the surface.

Dual-grid gages 13–16 are each of a symmetrical interleaved construction which overcomes the aforesaid difficulties. In FIGURE 3, these gages are represented in their relationship to the internal cylindrical gaging surface 7e which surrounds the transverse opening 7b in sensing element 7 (FIGURE 1), although it should be recognized that the flat-developed view is presented merely as an aid to understanding and that the surface 7e is in fact continuous and cylindrical in shape. Each of the dual-grid gages includes two electrically-isolated two-terminal resistance elements which independently exhibit the same changes in resistance with strain of the underlying gaging surface. The electrical connections of the two grids in each gage unit into different bridge circuit arrangements are established by the illustrated wiring in FIGURE 3, with conventional color-coding legends (W, B, B/W, R, G, and G/W) being noted on the drawing. Terminals 25 are brought to the outside of the cell housing through a sealed connector box 25a (FIGURE 1) and terminals 26 are similarly brought through a sealed connector box 26a (the interior constructional details of which are omitted from FIGURE 1). Electrical supply and measurement apparatus is connected in circuit with each of the two bridges, externally. So-called "modulus" gages, 27–30, affixed to the exterior of strain-sensing column portion 7a for the customary modulus compensation purposes, are also connected in circuit with the two bridges, in the manner shown and for known reasons which are not uniquely related to the present invention.

A preferred pattern of interleaving between parallel conductors of the two gaging grids is portrayed in the FIGURE 4 pictorial view of one of the dual-grid units, 13. There, the gages are of a foil type, in that their elongated spaced parallel conductors 31 and 32 atop a thin insulating membrane 33 are formed from conductive sheet foil which has been chemically etched to remove the unwanted areas, in accordance with techniques well established in the art. The remaining parallel conductors are about equally spaced, and are of about the same lengths and cross-sections; adjacent ends of all twelve conductors 31 and of the corresponding twelve conductors 32 are interconnected by the transverse enlarged (for low resistance) integral foil portions 31a and 32a, respectively, such that all of the parallel conductors 31 and all of the parallel conductors 32 are maintained electrically in series between their respective pairs of enlarged terminals 31b and 32b. Low resistance of the transverse end connections 31a and 32a renders inequalities in their total lengths non-critical. The parallel conductors 31 and 32 on each side of one parallel axis of symmetry, Y, are all of substantially the same total lengths (i.e., six conductor lengths), and these conductors also extend equal distances on each side of a second axis of symmetry, X, perpendicular to the first and lying in the same plane and intersecting the axis Y. Both grids lie at the same position along the third coordinate axis, Z, where they will remain at the same distance from a remote neutral axis, will both have the same stability under strain of the surface to which they are bonded, and will advantageously respond similarly to temperature variations. The patterns of interleaving on both sides of axis Y are the same; from this axis outwardly on each side there appears first two conductor lengths 32, then six conductor lengths 31, and, finally, four additional conductor lengths 32. Other numbers of conductors, in other interleaved substantially serpentine grid patterns, may obviously be devised to meet various needs. Foil and/or ribbon connections such as leads 34 (FIGURE 3) complete independent electrical couplings of the dual grids to the bridge circuit wiring, and may conveniently be mounted by bonding in insulating relationship to the columnar sensing-element surfaces. Although it is not depicted in FIGURES 3 and 4, the foil-type grids are preferably protectively covered with a further thin membrane which, like membrane 33, may conveniently comprise a resin-treated paper, such as one impregnated and/or coated with Bakelite. The same type of resin is preferably used for bonding the dual-grid gage unit to the sensing element surfaces. Fine wire may be employed in place of the foil, with similar generally-serpentine convolutions being employed for the coplanar interleaved grids, and similar patterns may be evolved for semi-conductor strain-gage materials also.

The improved form of dual-grid gages may be exploited to advantage in numerous ways, depending upon the applications and designs of the associated strain-responsive elements with which they are used. Having reference to the X, Y and Z axes marked in relation to the embodiment of FIGURE 4, the dual-grid strain gages may be oriented such that the loading axis of an associated strain-responsive element either coincides with or is parallel to these three gage axes. By way of example, on a simple column-type sensing element, two such dual-grid gages may have their X axes parallel with the longitudinal loading axis of the column, and two further dual-grid gages would then have their Y axes parallel to the loading axis. On a common ring-type sensing element, two dual-grid gages have their Z axes coincident with the loading axis of the element, and two further dual-grid gages have their Y axes parallel to the element's loading axis.

In both of these arrangements the totals of eight grids are conveniently wired into two bridges, both of which effect cancellation for undesirable strain responses to extraneous bendings of the sensing elements, whether of the type tending to distort the loading axis into C-shaped configuration (as may be caused by eccentric, angular, or side loading at one end) or into an S-shaped configuration (which may occur when side loadings tend to displace the two load-transmitting ends of a sensing element laterally in relation to one another). Either type of bending results in desired bridge cancellations of errors, whereas other gage grid arrangements are incapable of yielding this improved and precise result. Bridge network 35 is of the type under discussion, and represents schematically one of two like bridges associated with the load cell of FIGURES 1 and 3; the input of electrical supply is impressed upon and output of electrical signals to a measuring or recording instrument is tapped from the different opposite diagonals of the bridge, in accordance with well-established practices.

Although the indivdual dual-grid gage units are preferably formed substantially flat, they are readily converted into non-planar configurations, as in the case of the cylindrically-curved units 13–16. For some applications, such as those involving measurements of annular diaphragm strains, the interleaved serpentine conductors may be arcuate and of different lengths, rather than purely parallel and coextensive, with like beneficial effects. Spiral and other configurations may be developed, and the two grids in one unit may be shaped or made of different materials to exhibit different resistance characteristics. Other permissible variations will be evident to those skilled in the art.

Accordingly, it should be understood that the specific practices and preferred embodiments herein referred to have been offered by way of disclosure, rather than limitation, and that various modifications, additions and substitutions may be effected by those skilled in the art without departure from these teachings; it is therefore aimed in the appended claims to embrace all such variations as fall within the true spirit and scope of this invention.

What we claim as new and desire to secure by Letters Patent of the United States is:

1. An electrical strain gage unit comprising two groups of conductors each including a plurality of thin elongated strain-sensitive conductors of substantially the same length, means mounting said conductors in a coplanar and coextensive closely-spaced and uniformly-spaced insulated relationship wherein the same number of said conductors in each of said groups of conductors is disposed on each side of a first axis of symmetry of the unit and wherein substantially equal lengths of said conductors in each group of conductors are disposed on each side of a second axis of symmetry of the unit which is normal to and intersects said first axis, means extending substantially transversely to said conductors and electrically connecting in series relationship conductors in one group of said conductors which are interleaved with conductors in another group of said conductors, and means extending substantially transversely to said conductors and electrically connecting in an electrically independent series relationship said conductors in said other group of conductors, whereby the series-connected conductors in each of said groups of interleaved conductors are at substantially the same site and have electrical characteristics which are responsive to substantially the same external influences.

2. An electrical strain gage unit as set forth in claim 1 wherein said means electrically connecting said conductors in the series relationships have resistance low in relation to resistance of said thin elongated conductors.

3. An electrical strain gage unit as set forth in claim 1 wherein all of said strain-sensitive conductors extend in substantially the same direction and are parallel with one another and with said first axis, and further comprising means for electrically connecting the series-connected conductors in each of said groups into circuit relationships independently of the conductors of the other of said groups.

4. A symmetrical dual-grid electrical strain gage unit comprising a first grid of strain-sensitive conductive material having a substantially serpentine configuration wherein the convolutions thereof have highly elongated spaced conductor portions which are substantially coplanar and wherein the connections between said conductor portions have resistance low in relation to the resistance of said conductor portions, at least certain of the adjacent convolutions of said first grid having spaces therebetween to accommodate convolutions of a second grid therebetween in coplanar and spaced relationship therewith, a second grid of configuration complementary to that of said first grid and of conductive material having a substantially serpentine configuration wherein the convolutions thereof have highly elongated spaced conductor portions which are substantially coplanar with said conductor portions of said first grid and which are spaced to interleave with said conductor portions of said first grid in said spaces and wherein the connections between said conductor portions of said second grid have resistance low in relation to the resistance of said conductor portions of said second grid, said first and second interleaved grids being of complementary configurations wherein said conductor portions thereof and the connections between conductor are in electrically noncontacting relationship, each of said grids having the same number of elongated conductor portions disposed on each side of a first axis of symmetry of the unit and having substantially equal lengths of said conductor portions disposed on each side of a second axis of symmetry of the unit which is normal to and intersects said first axis, and deformable insulating membrane means supporting the interleaved grids, whereby the interleaved grids are at substantially the same site and have electrical characteristics which are responsive to substantially the same external influences.

References Cited by the Examiner

UNITED STATES PATENTS

| 2,576,417 | 11/1951 | Ruge | 338—5 |
| 3,034,346 | 5/1962 | Starr | 73—141 |
| 3,034,347 | 5/1962 | Starr | 73—141 |
| 3,100,290 | 8/1963 | Propper | 338—5 |

FOREIGN PATENTS

| 691,624 | 7/1964 | Canada. |
| 921,837 | 3/1963 | Great Britain. |

RICHARD M. WOOD, *Primary Examiner.*

W. D. BROOKS, *Assistant Examiner.*